(12) United States Patent
Goto

(10) Patent No.: US 7,583,523 B2
(45) Date of Patent: Sep. 1, 2009

(54) THREE PHASE INVERTER CONTROL CIRCUIT DETECTING TWO PHASE CURRENTS AND DEDUCTING OR ADDING IDENTICAL ON PERIODS

(75) Inventor: Naomi Goto, Shiga (JP)

(73) Assignee: Panasonic Corporation, Osaka (JP)

( * ) Notice: Subject to any disclaimer, the term of this patent is extended or adjusted under 35 U.S.C. 154(b) by 286 days.

(21) Appl. No.: 11/631,868

(22) PCT Filed: Jul. 19, 2005

(86) PCT No.: PCT/JP2005/013253

§ 371 (c)(1),
(2), (4) Date: Jan. 8, 2007

(87) PCT Pub. No.: WO2006/009145

PCT Pub. Date: Jan. 26, 2006

(65) Prior Publication Data

US 2007/0189048 A1 Aug. 16, 2007

(30) Foreign Application Priority Data

Jul. 20, 2004 (JP) ............................. 2004-211313
Dec. 22, 2004 (JP) ............................. 2004-370588
May 20, 2005 (JP) ............................. 2005-147876

(51) Int. Cl.
*H02M 7/5387* (2007.01)
(52) U.S. Cl. ........................................ 363/98; 363/132
(58) Field of Classification Search .................. 363/97, 363/98, 132
See application file for complete search history.

(56) References Cited

U.S. PATENT DOCUMENTS

| 4,772,996 | A | * | 9/1988 | Hanei et al. ................... 363/41 |
| 4,777,578 | A | * | 10/1988 | Jahns .......................... 363/98 |
| 5,214,575 | A | * | 5/1993 | Sugishima et al. ............. 363/37 |
| 5,253,156 | A | * | 10/1993 | Sakurai et al. ................ 363/98 |
| 5,280,228 | A | * | 1/1994 | Kanouda et al. ............. 318/803 |
| 5,825,641 | A | * | 10/1998 | Mangtani ..................... 363/98 |
| 6,239,998 | B1 | * | 5/2001 | Majumdar et al. ............ 363/98 |
| 6,301,137 | B1 | * | 10/2001 | Li ............................... 363/98 |
| 7,483,279 | B2 | * | 1/2009 | Lee .............................. 363/41 |
| 2007/0165431 | A1 | * | 7/2007 | Gunji .......................... 363/98 |

FOREIGN PATENT DOCUMENTS

JP          5-207754          8/1993

(Continued)

*Primary Examiner*—Jeffrey L Sterrett
(74) *Attorney, Agent, or Firm*—Wenderoth, Lind & Ponack, L.L.P.

(57) ABSTRACT

A small and highly vibration-proof inverter capable of detecting a phase current without requiring the development of complicated control software and without causing any current distortion is provided. Shunt resistors (15, 16) serving as a kind of current detector are provided, respectively, between lower arm switching elements X, Y, Z) in only two phases—and the minus side of a DC power supply. An identical ON period is reduced from the ON periods of upper arm switching elements (U, V, W) in the carrier cycle entirely for three phases. Consequently, phase current is detected for the two phases provided with the shunt resistors (15, 16). The inverter can detect the phase current without complicating the control software and without causing any current distortion, by controlling inverter circuit (10) with control software incorporated in control circuit (14) through connection lines (18).

15 Claims, 17 Drawing Sheets

FOREIGN PATENT DOCUMENTS

| | | |
|---|---|---|
| JP | 2000-333465 | 11/2000 |
| JP | 2003-079159 | 3/2003 |
| JP | 2003-164159 | 6/2003 |
| JP | 2003-189670 | 7/2003 |
| JP | 2003-284374 | 10/2003 |
| JP | 2003-348858 | 12/2003 |

* cited by examiner (100% Modulation)

Period(a)

Period(b)

Period(c)

US 7,583,523 B2

THREE PHASE INVERTER CONTROL CIRCUIT DETECTING TWO PHASE CURRENTS AND DEDUCTING OR ADDING IDENTICAL ON PERIODS

TECHNICAL FIELD

The present invention relates to a three phase PWM (Pulse Width Modulation) inverter provided with a phase current detection means.

BACKGROUND ART

Conventionally, in inverters which drive sensorless DC brushless motors with a PWM sinusoidal drive method, a method of detecting two currents out of the three output lines of the inverter is known (Japanese Patent Unexamined Publication No. 2000-333465, FIG. 2, page 9, for example).

The circuit for the above detecting method is described below. FIG. 11 shows the inverter and electrical circuits around it. To control circuit 7 of inverter 20, the phase U current is input from current sensor 8, and the phase W current is input from current sensor 9. Based on the values of these two currents, the phase V current is calculated by applying Kirchhoff's current law at the neutral point of stator winding 4. Using these phase U, phase V and phase W current values, induction voltage induced at stator winding 4 by magnet rotor 5 of sensorless DC brushless motor 11 (hereinafter referred to as motor) is calculated, for detecting the position of magnet rotor 5. A rotating speed-command signal (not shown), is used for controlling switching elements 2 formed of IGBT (Insulated Gate Bipolar Transistor), so that the direct-current voltage of battery 1 is switched by the PWM method. Accordingly, sine wave-like alternating current is outputted to stator winding 4 of motor 11. Diodes 3 of inverter circuit 10 provide a reflux route for a current which flows in stator winding 4. Switching elements 2 of the upper arm are defined as U, V and W, and those of the lower arm are defined as X, Y and Z. The diodes corresponding to respective switching elements U, V, W, X, Y and Z are defined as 3U, 3V, 3W, 3X, 3Y and 3Z.

Since electric potential changes to a plus side and to a minus side of battery 1, it is difficult to constitute current sensors 8 and 9 with shunt resistors; therefore, hall devices are used.

As another method for detecting the phase current, the method for detecting the phase current using a shunt resistor is disclosed, for example, in Japanese Patent Unexamined Publication No. 2003-189670 (page 2, claim 2, page 14, FIG. 1, page 15, FIG. 9).

In the following, the above detecting method is described. FIG. 12 shows the inverter and circuits around it. Control circuit 12 of inverter 21 calculates the current based on a voltage incurred at shunt resistor 6.

FIG. 13 is a waveform characteristics chart showing three phase modulation at 50% modulation, and FIG. 14 shows that at 100% modulation. Phase U terminal voltage 41, phase V terminal voltage 42, phase W terminal voltage 43, and voltage 29 at a neutral point is shown therein. Vertical axis represents a terminal voltage in terms of PWM duty (%). The voltage at neutral point 29 indicates the sum of terminal voltages of respective phases divided by three. The phase voltage value is the terminal voltage minus the neutral point voltage, which takes shape of a sine waveform.

FIG. 15 is a timing chart within one carrier (carrier cycle) of the three phase modulation. An exemplary ON/OFF status within one carrier (carrier cycle) of the upper arm switching elements U, V, W, and the lower arm switching elements X, Y, Z are shown. This is a timing chart in a case of the 50% modulation, approximate phase 120 degrees in FIG. 13. Generally, this is implemented by the timer function of a microcomputer. When the upper arm switching elements in the same phase are ON, those of the lower arm are OFF. On the contrary, when those of the upper arm are OFF, those of the lower arm are ON. In order to make the illustration simple, dead time for preventing the short-circuiting between the upper arm switching element and the lower arm switching element has been eliminated.

There are four states (a), (b), (c) and (d) in the switching of respective switching elements. FIG. 16 through FIG. 19 illustrate each of the above states.

In the period (a), all the upper arm switching elements U, V, W are OFF, whereas all the lower arm switching elements are ON. The phase U current and the phase V current flow to stator winding 4 from diode 3X and diode 3Y parallel to the lower arm switching elements X and Y, respectively, while the phase W current flows out of stator winding 4 to the lower arm switching element Z. A current is circulating between the lower arm and motor 11 (hereinafter referred to as lower circulating period). It is in the state of non-electric supply, during which there is no power supply from battery 1 to inverter circuit 10 (motor 11).

In the period (b), the upper arm switching element U is ON and the lower arm switching elements Y and Z are also ON. The phase U current flows from the upper arm switching element U to stator winding 4, and phase V current flows from the parallel diode 3Y parallel to lower switching element Y to stator winding 4. The phase W current flows out of stator winding 4 to the lower arm switching element Z. It is in the electric supply state, in which battery 1 supplies power to inverter circuit 10 (motor 11). At this time, the phase U current flows in the power source line (shunt resistor 6).

In the period (c), the upper arm switching elements U and V are ON, and the lower arm switching element Z is ON. The phase U current and the phase V current flow to stator winding 4 from the upper arm switching elements U and V, respectively, and the phase W current flows out of stator winding 4 to the lower arm switching element Z. It is in the electric supply state, in which battery 1 supplies power to inverter circuit 10 (motor 11). The phase W current flows in the power source line (shunt resistor 6).

In the period (d), all the upper arm switching elements U, V, W are ON, and all the lower arm switching elements X, Y, Z are OFF. The phase U current and phase V current flow from the upper switching element U and upper switching element V, respectively, to stator winding 4, and the phase W current flows out of stator winding 4 to the parallel diode 3W of the upper arm switching element W. A current is circulating between the upper arm and motor 11 (hereinafter referred to as upper circulating period). It is in the state of non-electric supply, in which no power is supplied from battery 1 to inverter circuit 10 (motor 11).

As described in the above, whether or not there is current, including the phase current, flowing in the power source line (shunt resistor 6) can be known from the ON/OFF state of the upper arm switching elements U, V, W. When there is no phase in which the upper arm switching element is ON, there is no current flow (non-electric supply, lower circulating period); when one phase is ON, there is current flow in that phase (electric supply); when two phases are ON, there is current flow in the remaining phase (electric supply); when all the three phases are ON, there is no current flow (non-electric supply, upper circulating period).

FIG. 20 illustrates, based on FIG. 15, the ON period (duty) of the upper arm switching elements U, V, W within one carrier (carrier cycle), in the 50% three phase modulation shown in FIG. 13, at phases 30 degrees, 45 degrees, 60 degrees, 75 degrees and 90 degrees.

ON period of the upper arm switching element U of phase U is represented by a fine solid line, ON period of the upper arm switching element V of phase V is represented by a medium solid line, and ON period of the upper arm switching element W of phase W is represented by a bold solid line. Period of electric supply, in which battery 1 supplies the power to stator winding 4, is shown with solid line arrow marks, and the phase currents then flowing in the power source line (shunt resistor 6) are designated with the indications U, V and W. Non-electric supply period (lower circulating period, upper circulating period) is shown with a broken line arrow marks.

FIG. 21 likewise illustrates the 100% three phase modulation of FIG. 14. As shown in FIG. 20 and FIG. 21, phase current can be detected by means of shunt resistor 6 for one phase or two phases. In a case where only one phase can be detected, a way of increasing, or decreasing, the ON period of parts of the phases (upper arm switching elements) has been disclosed (for example, in Japanese Patent Unexamined Publication No. 2003-189670, page 2, claim 2, page 14, FIG. 1, page 15, FIG. 9).

As shown in FIG. 20 and FIG. 21, the period (d) at the middle of carrier cycle in the three phase modulation is the non-electric supply period. In the two phase modulation, the period (d) does not exist since one phase is fixed. There is the non-electric supply period at the beginning and at the end within a carrier cycle. Therefore, there is an electric supply period in the first half and the latter half of a carrier cycle, respectively. As compared with the case of two phase modulation in which the electric supply (current flow) period is only one, the carrier cycle has been halved, namely the carrier frequency has been increased to be identical to double the frequency (hereinafter referred to as carrier cycle shortening effect), and the PWM modulation has been further elaborated. Thus, the current ripple and the torque ripple are reduced in the three phase modulation compared with two phase modulation. This reduces the vibration and the noise.

In the 100% modulation shown in FIG. 21, there is only one electric supply period in a carrier cycle at phase 30 degrees, hence, no carrier cycle shortening effect is made available. At phase 90 degrees, since there is no non-electric supply period at the beginning and at the end of a carrier cycle, the electric supply periods are mingled with those before and after the carrier cycle. So, even though there are two electric supply periods in a carrier cycle, eventual number of electric supply periods for each carrier cycle become to be only one, therefore, no carrier cycle shortening effect can be made available.

Still other method of detecting the phase current using shunt resistors is proposed (for example, Japanese Patent Unexamined Publication No. 2003-284374, page 7, FIG. 1).

The proposed method is described below. FIG. 22 shows the inverter and circuits around it. Control circuit 13 of inverter 22 calculates currents based on voltages respectively generated at shunt resistor 15 provided between the lower arm of phase U and the ground, at shunt resistor 16 provided between the lower arm of phase V and the ground, and at shunt resistor 17 provided between the lower arm of phase W and the ground.

FIG. 23 shows the ON period (duty) of lower arm switching elements X, Y, Z corresponding to FIG. 20. In order to make the illustration simple, the dead time for preventing the short-circuiting between the upper arm switching element and the lower arm switching element has been eliminated. ON period of the lower arm switching element X of phase U is represented by a fine solid line, ON period of the lower arm switching element Y of phase V is represented by a medium solid line, and ON period of the lower arm switching element Z of phase W is represented by a bold solid lime. The lower circulating period is represented by bold broken line arrow marks, and the upper circulating period is represented by fine broken line arrow marks.

Likewise, FIG. 24 shows the ON period (duty) of lower arm switching elements X, Y, Z corresponding to FIG. 21. The time when current flows in shunt resistor 15, or the time when it can detect the current, is ON period of the lower arm switching element X. The time when current flows in shunt resistor 16, or the time when it can detect the current, is ON period of the lower arm switching element Y. The time when current flows in shunt resistor 17, or the time when it can detect the current, is ON period of the lower arm switching element Z.

Thus, in FIG. 24 the current can be detected only for the two phases (phase V, phase W) at phase 90 degrees, whereas, current can be detected with all the three phases in FIG. 23. Therefore, it has to be controlled so as to detect the current of phase W and phase U at phase 210 degrees, and phase U and phase V at phase 330 degrees.

As described in the above, in a three phase PWM inverter, there is a certain specific phase in which the electric supply period exists for one in a carrier cycle. Since there is no non-electric supply period at the beginning and at the end of a carrier cycle, the electric supply period is mingled with those before and after the carrier cycle. So, in a certain specific phase the carrier cycle, shortening effect can not be made available.

The conventional methods of detecting the phase current have their own respective problems to be solved.

A current sensor used in the method of detecting the current direct of output line from an inverter is formed of a hall device, a flux generating coil, the devices' peripheral circuit, etc. So, the size reduction and reinforcement of vibration-proof property are the problems to be solved. Furthermore, because of the bulky size, freedom degree of layout on a printed board is limited.

In the method of detecting a phase current which flows in the power source line by means of a shunt resistor; if the detection by shunt resistor is made for only one phase, it is required to increase, or decrease the ON period in parts of phases (upper arm switching element). This complicates software for controlling. Furthermore, increase or decrease of parts of phases (upper arm switching element) of the ON period brings about a distortion in the current waveform. This is an adverse factor against noise and vibration.

In a cases in which an air-conditioner compressor is driven with an inverter, it may be possible for the room air-conditioners to use a soundproofing device, such as a sound-proof box. In a case of a vehicle-mounted electric compressor, however, the space for installation and the allowable weight are limited. So, installation of a soundproofing device may be difficult. In addition, the intrusion of vibration into vehicle cabin has to be suppressed to a minimum, however, introduction of a quake isolating device may be almost as difficult by the same reasons. In the face of prevailing environment-conscious attitude, the noise and vibration due to room air-conditioners are also requested to be lower.

In the method of detecting a phase current by means of shunt resistors provided between the lower arm of each of phases and the ground, if there is a phase in which ON period of the lower arm switching element in a carrier cycle is 0% or close to 0%, it can be detected only for two certain specific phases. Therefore, the two certain specific phases to be detected need to be changed depending on phase. This complicates the control software. And, each of the three phases needs to be provided with a shunt resistor, which increases the parts counts. This is against the downsizing efforts, and power consumption and heat generation by the shunt resistors have to be considered too.

The present invention aims to solve the above-described conventional problems, and offers a compact and vibration-proof inverter which is capable of detecting a phase current without requiring the development of control software of high complexity and without causing any current distortion.

SUMMARY OF THE INVENTION

An inverter in the present invention includes the upper arm switching elements connected with the plus side (first power source terminal) of a direct-current power source and the lower arm switching elements connected with the minus side (second power source terminal) of the direct-current power source for three phases. The inverter outputs sine wave-like three phase alternating current by switching the direct-current voltage of the direct-current power source by means of the PWM three phase modulation. A current detector is provided between the lower arm switching element and the minus side of the direct-current power source for two phases among the three phases. An identical ON period is deducted from ON period of the upper arm switching elements within a carrier cycle for all the three phases. A control circuit detects a phase current for the two phases provided with the current detector.

The above-configured inverter can extend the ON period of lower arm switching elements without requiring the development of control software of high complexity. This provides a certain period within one carrier in which period current flows in all the three phases of the lower arm switching elements. Consequently, it can detect the current for the three phases with the two current detectors alone (that of the remaining one phase is obtainable through a calculation). Since it reduces an identical ON period with all of the three phases, viz. it does not increase, or decrease, the ON period with parts of phases only (upper arm switching elements), the electric supply period of three phase modulation remains unchanged, so, no current distortion is caused. Furthermore, the carrier cycle shortening effect turns out to be available even in a region where it used to be unavailable, and it makes the current smoother.

Since the present method is also the one which uses the detected current values of two certain specific phases, it is easy to change a conventional method, which uses two certain specific phases in detecting the direct current itself flowing in the output line of an inverter, to the new method. Namely, freedom degree of disposing the current detectors on a printed board increases.

The use of a shunt resistor for the current detector would be advantageous for reducing the size and improving the vibration-proof and heatproof capabilities.

An inverter in the present invention can be compact in size, high in the vibration-proof performance and makes the current smoother, and capable of detecting the phase current without requiring control software of high complexity, and without causing any current distortion.

A first inverter in the present invention includes the upper arm switching elements connected with the plus side of a direct-current power source and the lower arm switching elements connected with the minus side of the direct-current power source for three phases. The inverter outputs sine wave-like three phase alternate current by switching the direct-current voltage of the direct-current power source by means of the PWM three phase modulation. A current detector is provided between the respective lower arm switching elements and the minus side of the direct-current power source, in two phases among the three phases. Phase current in the two phases provided with the current detector is detected by deducting an identical ON period from ON period of the upper arm switching element within a carrier cycle with all the three phases.

With the above-described structure, the ON period of the lower arm switching elements can be extended without requiring control software of high complexity. This provides a certain period within one carrier in which period the lower arm switching element have current flow in all the three phases. Therefore, it can detect the current for the three phases using only two current detectors (that of the remaining one phase can be obtained by a calculation). Since it deducts an identical ON period with all of the three phases, in other words, it is not the increase, or decrease, of ON period with parts of phases alone (upper arm switching elements), the electric supply period of the three phase modulation remains unchanged. So, no current distortion is caused. Furthermore, the carrier cycle shortening effect is made available even in a region where the carrier cycle shortening effect used to be unavailable. It makes the current still smoother.

Since the present method is also that which uses the current values of two certain specific phases, it is easy to change the conventional method which makes use of detected current values of two certain specific phases, or a method which detects direct the current in output line of an inverter, into the new method. Namely, freedom degree of disposing the current detectors on a printed board, etc, increases.

Thus, the inverter is capable of detecting the phase current for three phases without requiring control software of high complexity and without causing any current distortion, and provides a still smoother current.

A second inverter in the present invention is that of the first inverter, in which it conducts the deduction of ON period with upper arm switching element with all the three phases when there exists a certain phase where ON period of the lower arm switching element in a carrier cycle is 0% or close to 0%. In other words, without considering the dead time, it is conducted in such a case where there is a certain phase in which ON period of the upper arm switching element is 100% or close to 100% in a carrier cycle. It is conducted only in a limited case of high modulation level. Accordingly, an inverter of still simpler control is provided.

A third inverter in the present invention is that of the first inverter, in which it conducts the deduction of ON period with the upper arm switching element with all the three phases avoiding such a period in which a state of all the upper arm switching elements are ON is 0% or close to 0%, in other words, it is conducted trying not to be close to 0%. By so doing, the carrier cycle shortening effect can be ensured. Thus, the inverter is capable of detecting the phase current for three phases without requiring control software of high complexity and without causing any current distortion, and provides a still smoother current maintaining the current smoothing effect of three phase modulation.

A fourth inverter in the present invention is that of the first inverter, in which it conducts the deduction of ON period of the upper arm switching element with all the three phases so that a period in which all the upper arm switching elements are ON equals to a period in which all the upper arm switching elements are OFF. Intervals among electric supply periods (current flow periods) become to be equal, the carrier cycle shortening effect is increased, and the current of three phase modulation can be made to be still smoother. As the results, the advantages of lower-noise and less-vibration in the three phase modulation are further intensified. The inverter is capable of detecting the phase current for the three phases without requiring control software of high complexity and without causing any current distortion.

A fifth inverter in the present invention includes, for three phases, the upper arm switching element connected with the plus side of a direct-current power source and the lower arm switching element connected with the minus side of the direct-current power source. The inverter outputs sine wave-like three phase alternate current by switching the direct-current voltage of the direct-current power source by means of the PWM three phase modulation. A current detector is provided for detecting a current between the upper arm switching elements and the plus side of the direct-current power source, in two phases among the three phases. It can detect the phase current for the two phases provided with the current detector, by adding an identical ON period to ON period of the upper arm switching element within a carrier cycle for all the three phases.

With the above-described structure, ON period of the upper arm switching element can be extended without requiring control software of high complexity. Accordingly, a certain period is provided within one carrier in which period the current flows in the upper arm switching element in all the three phases. Thus, it can detect the current for three phases using only the two current detectors. That of the remaining one phase is obtainable through a calculation. Since it adds an identical ON period in all the three phases, in other words, it is not a partial increase, or decrease, of ON period in only parts of phases (upper arm switching elements), the electric supply time of three phase modulation remains unchanged. So, no current distortion is caused. Furthermore, the carrier cycle shortening effect is made available even in a region where the carrier cycle shortening effect used to be unavailable. The current can be made still smoother.

Since the present method is also that which uses detected current values of the two certain specific phases, it is easy to change the conventional method which makes use of detected current values of two certain specific phases, or a method which detects direct the current in output line of an inverter, into a method that fits to the present method. Freedom degree of disposing current detectors on a printed board increases.

The present inverter is capable of detecting the phase current for the three phases without requiring control software of high complexity and without causing any current distortion, and provides a still smoother current.

A sixth inverter in the present invention is that of the fifth inverter, in which it conducts the addition of ON period to the upper arm switching element with all the three phases when there exists a certain phase in which the state of ON period of upper arm switching element is 0% or close to 0% in a carrier cycle. In other words, without considering the dead time, it is conducted in such a case where there is a certain phase in which the state of ON period with lower arm switching element is 100% or close to 100% in a carrier cycle. It is conducted only in a limited case of high modulation level. This provides an inverter whose control is still simpler.

A seventh inverter in the present invention is that of the fifth inverter, in which it conducts the addition of ON period to the upper arm switching element with all the three phases avoiding such a period where the state is ON with all the lower arm switching element is 0% or close to 0%; in other words, it is conducted trying not to be close to 0%. By so doing, the carrier cycle shortening effect can be ensured. Thus, the inverter is capable of detecting the phase currents for three phases without requiring control software of high complexity and without causing any current distortion, and provides a still smoother current maintaining the current smoothing effect of three phase modulation.

An eighth inverter in the present invention is that of the fifth inverter, in which it conducts the addition of ON period with the upper arm switching element with all the three phases so that a period in which all of the upper arm switching elements are ON equals to a period in which all of the upper arm switching elements are OFF. Intervals among electric supply periods become to be equal, the carrier cycle shortening effect is increased, and the current of three phase modulation can be made still smoother. As the results, the advantages of lower-noise and less-vibration of the three phase modulation are further intensified. The inverter is capable of detecting the phase current for the three phases without requiring control software of high complexity and without causing any current distortion.

A ninth inverter in the present invention is that of either one of the first inverter and the fifth inverter, in which it uses a shunt resistor as the current detector. This makes it possible to reduce the size and to reinforce the vibration-proof advantage.

A tenth inverter in the present invention is that of either one of the first inverter and the fifth inverter, in which it outputs a sine wave-like three phase alternating current to a sensorless DC brushless motor, and it detects a rotor position of sensorless DC brushless motor based on the phase current in the two detected phases. Thus, the present inverter, which is compact in size and highly vibration-proof, is capable of driving a sensorless DC brushless motor at low noise and low vibration without requiring control software of high complexity and without causing any current distortion.

An eleventh inverter in the present invention is that of the tenth inverter, which is mounted on an electric compressor driven by a sensorless DC brushless motor. The inverters are required to be small enough to be mounted on the electric and they are required to be tough enough to withstand the vibration due to motor. The present inverter, which is compact in size, highly vibration-proof, free from current distortion, capable of driving a motor with low vibration, would provide substantial advantages.

A twelfth inverter in the present invention is that of either one of the first inverter and the fifth inverter, which is to be used on board a vehicle. The inverters for use in such field of application are required to be compact in size and light in weight. So, it is difficult for them to have sufficient considerations on the sound-proof and vibration-proof performance. At the same time, they are required to be tough enough to withstand the vibration of a cruising vehicle. The present inverter, which is compact in size, vibration-proof, and low in the operating noise/vibration, would be advantageous in this field of application.

Now in the following, exemplary embodiments of the present invention are described referring to the drawings. It is to be noted that the exemplary embodiments are not to be interpreted to limit the present invention.

Figure 1:
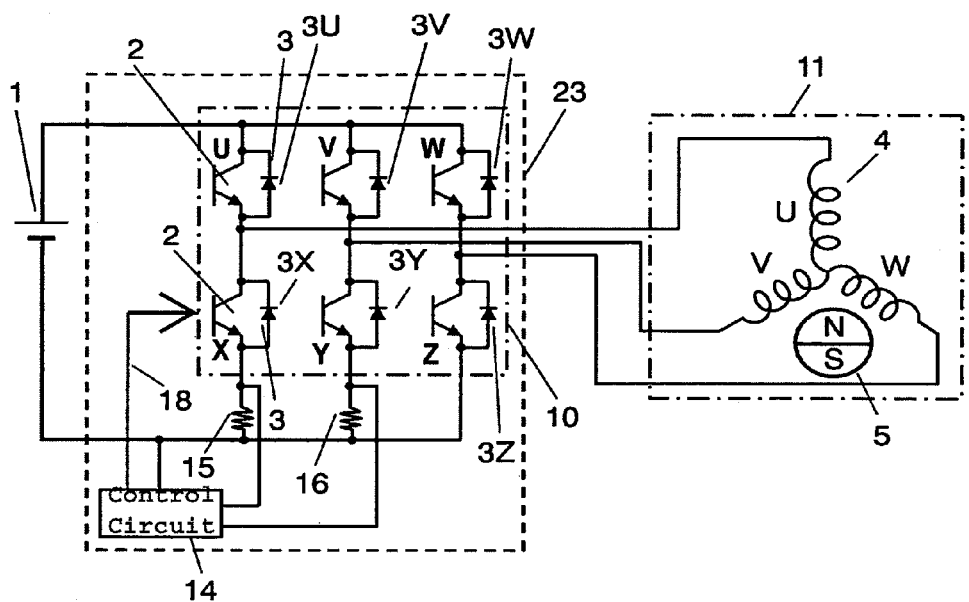
FIG. 1 is an electrical circuit diagram of an inverter and its periphery in accordance with a first embodiment of the present invention.

Reference marks in the drawings:

| 1 | Battery |
|---|---|
| 2 | Switching Element |
| 3 | Diode |
| 4 | Stator Winding |
| 5 | Magnet Rotor |
| 10 | Inverter Circuit |
| 11 | Sensorless DC Brushless Motor |
| 14 | Control Circuit |
| 15, 16 | Shunt Resistor |
| 18 | Connection Line |
| 23 | Inverter |
| 40 | Electric Compressor |

DETAILED DESCRIPTION OF PREFERRED EMBODIMENTS

First Exemplary Embodiment

Figure 22:
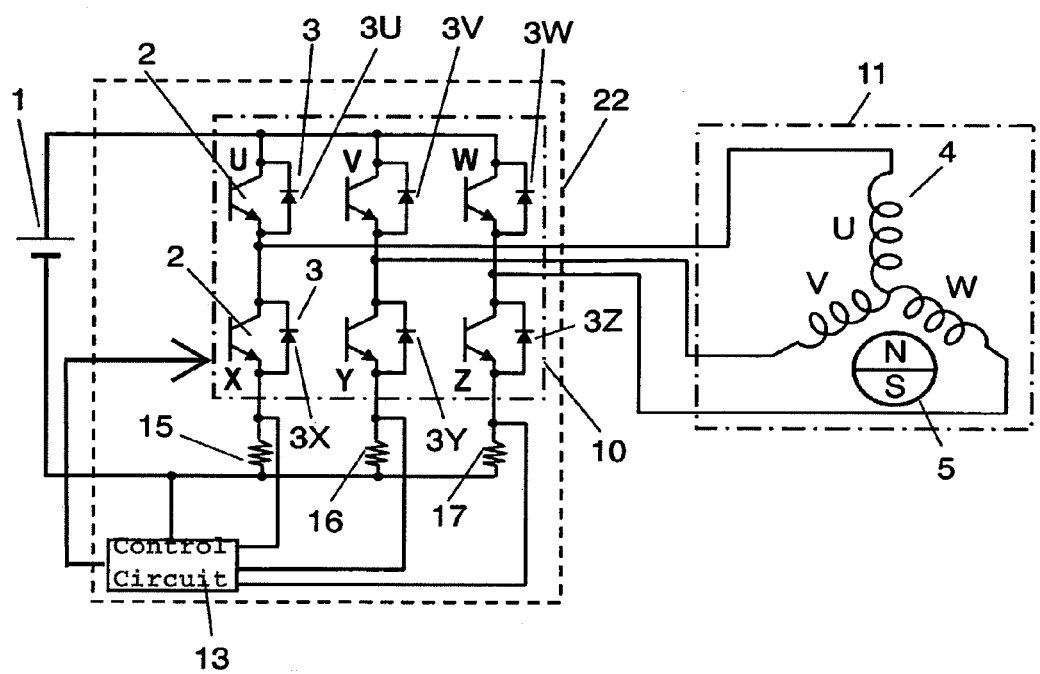
FIG. 22 is an electrical circuit diagram of an inverter and its periphery for detecting phase current by means of three shunt resistors disposed between an lower arm and a ground.
Figure 23:
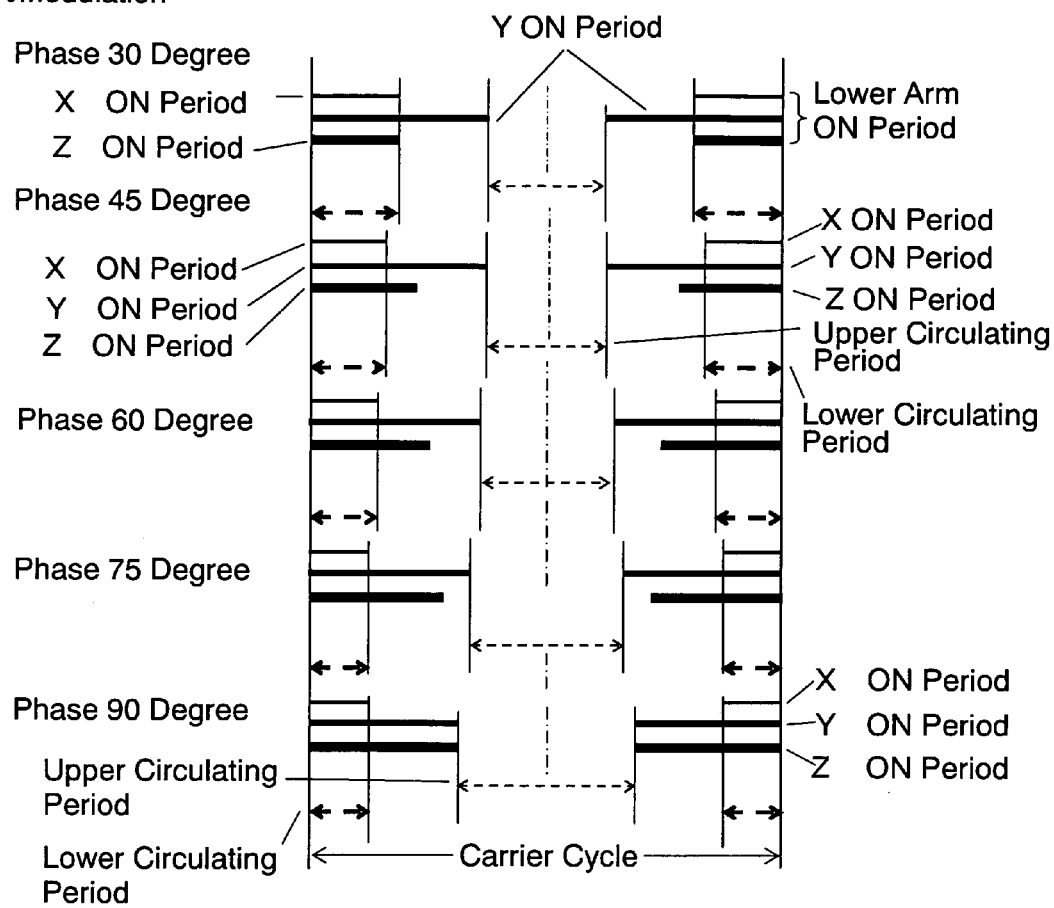
FIG. 23 is a characteristic chart showing a lower arm's ON period, an upper circulating period and a lower circulating period at phases 30 degrees-90 degrees in 50% three phase modulation.

FIG. 1 shows an electrical circuit diagram of inverter 23 and its periphery in accordance with a first exemplary embodiment of the present invention. As compared with that of the background art shown in FIG. 22, shunt resistor 17 has been eliminated and control circuit 13 has been replaced with control circuit 14. Other portion of the circuit remains the same as that shown in FIG. 22, and the same symbols are used for the respective corresponding items.

Control circuit 14 is connected with upper arm switching elements U, V, W and lower arm switching elements X, Y, Z, through connection lines 18, and controls respective switching elements. In a case where an IGBT or a power MOS FET is used as the switching element, the control circuit controls the gate voltage; where a power transistor is used, it controls the base current.

Figure 24:
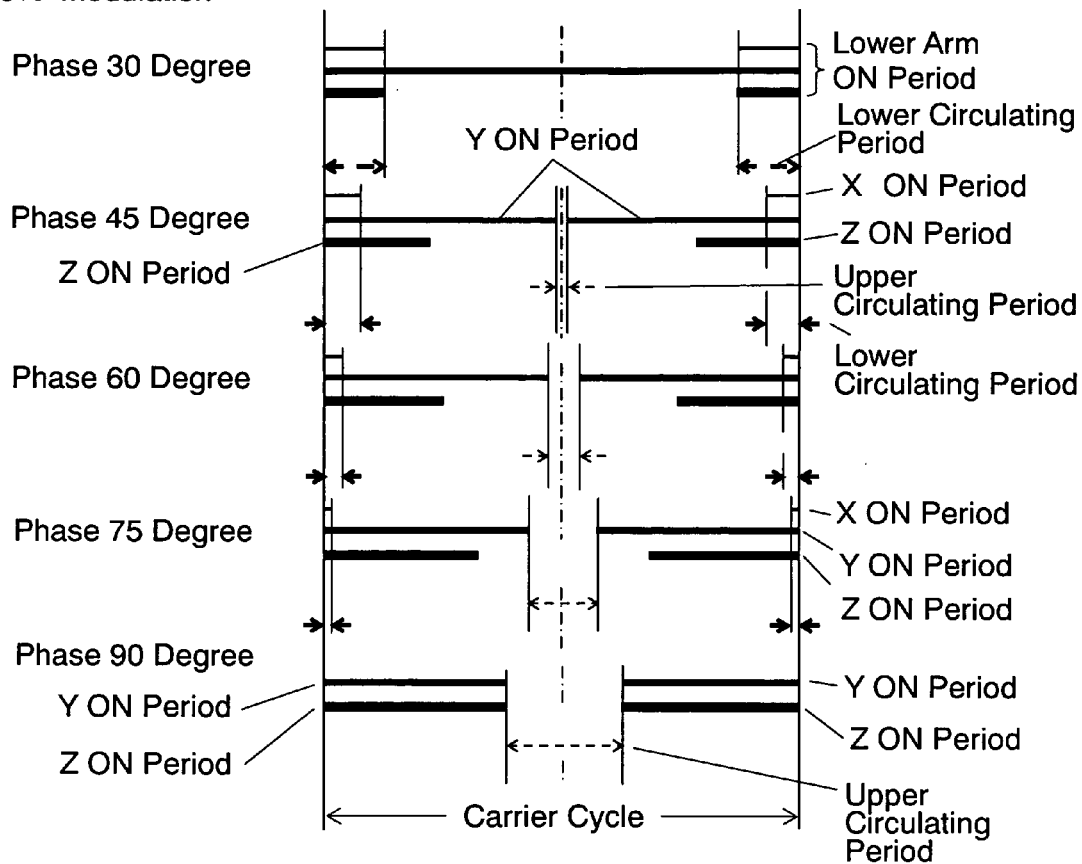
FIG. 24 is a characteristic chart showing a lower arm's ON period, an upper circulating period and a lower circulating period at phases 30 degrees-90 degrees in 100% three phase modulation.

In FIG. 24, at phase 90 degrees, current flows in the lower arm in two phases (phase V, phase W) only. Likewise, at phase 210 degrees, in phase W and phase U; at phase 330 degrees, in phase U and phase V. Therefore, the shunt resistor is needed for three pieces, like inverter 22 of FIG. 22.

Figure 2:
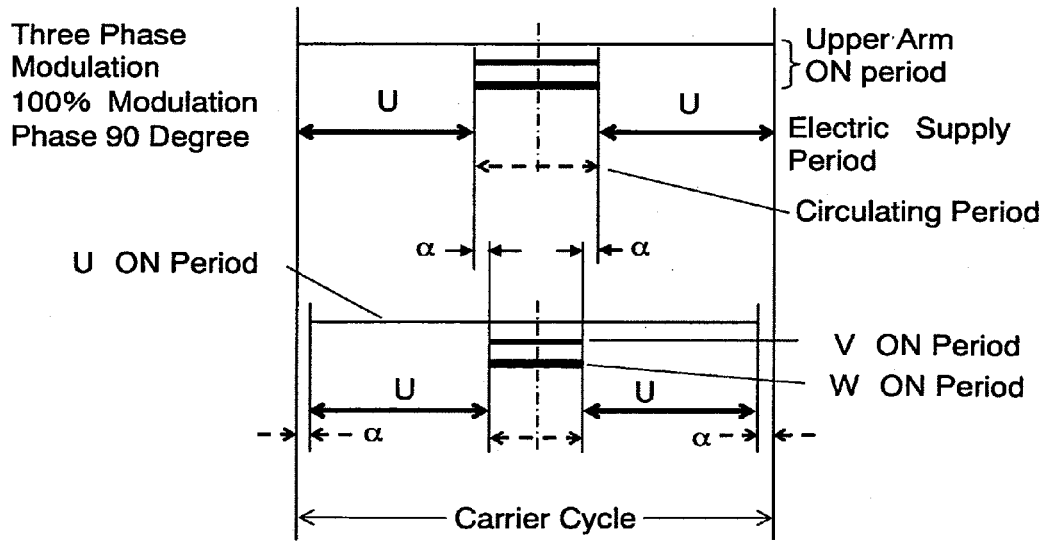
FIG. 2 is a characteristic chart showing an upper arm's ON period, an electric supply period and a circulating period at phase 90 degrees, in the first embodiment.

FIG. 2 shows a method in which, at phase 90 degrees, the current flows in the lower arm for three phases. Upper part of FIG. 2 shows the state of FIG. 21 at phase 90 degrees, as it is. In this state, no carrier cycle shortening effect is made available. In the lower part, ON periods of the upper arm U, V, W are shown after deducting from them an identical ON period 2α. Since an identical ON period has been deducted in all the three phases, the length of electric supply period during which phase U current flows in the power source line remains unchanged. Because the PWM three phase modulation has not been changed, it does not cause any current distortion. Furthermore, a circulating period of lengths is formed at the beginning and at the end within a carrier cycle. Accordingly, the number of electric supply period becomes two for one carrier cycle. This generates the carrier cycle shortening effect.

As generally known well, carrier cycle is a unit time of the PWM modulation, or the time when the switching duty is 100%. A frequency in which the time is identical to one cycle makes the carrier frequency. For example, a carrier cycle of carrier frequency 5 kHz is 200 μs.

As already described earlier, the carrier cycle shortening effect is that, in the three phase modulation, there is non-electric supply period at the middle of a carrier cycle, and at the beginning and the end within a carrier cycle, so that the electric is supplied split in the first half and in the latter half of a carrier cycle. Accordingly, the carrier cycle is made to be equivalent to the half (carrier frequency is doubled) with respect to the electric supply, and the PWM modulation becomes more elaborate. In the above example, the carrier cycle becomes to be equivalent to 100 μs, and the carrier frequency to be equivalent to 10 kHz.

Figure 3:
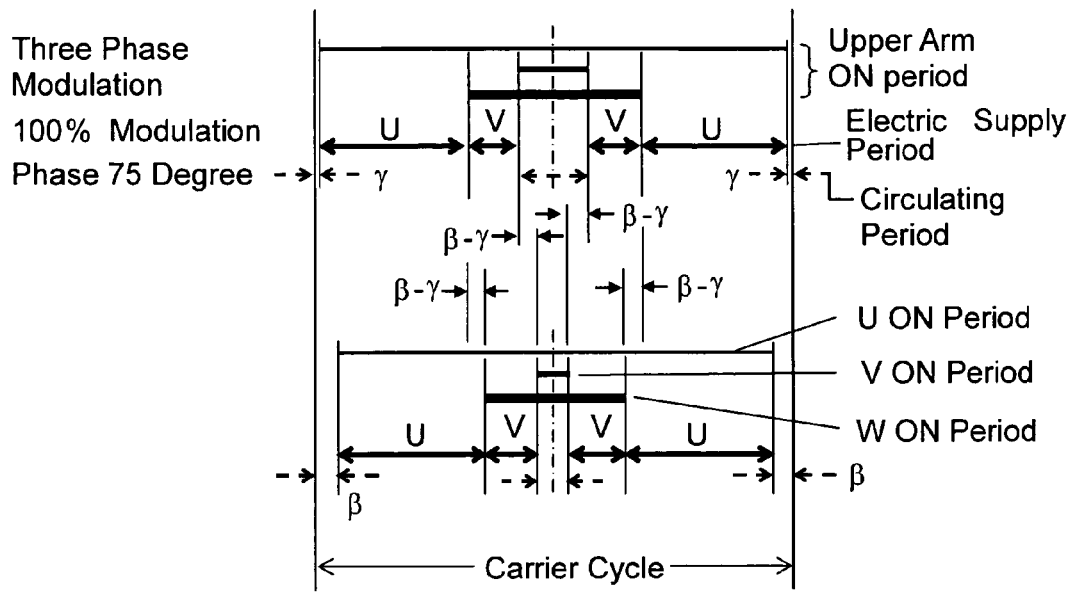
FIG. 3 is a characteristic chart showing an upper arm's ON period, an electric supply period and a circulating period at phase 75 degrees, in the first embodiment.

FIG. 3 shows a case of phase 75 degrees. Respective ON periods of the upper arms U, V, W have been reduced by an identical ON period $2*(\beta-\gamma)$, and a circulating period of length β has been formed at the beginning and at the end within a carrier cycle. Like in the earlier example, since an identical ON period has been deducted in all the three phases, the length of electric supply period during which phase U current and phase V current flow in the power source line remains unchanged. Because there is no change in the PWM three phase modulation, it does not cause any current distortion.

Figure 4:
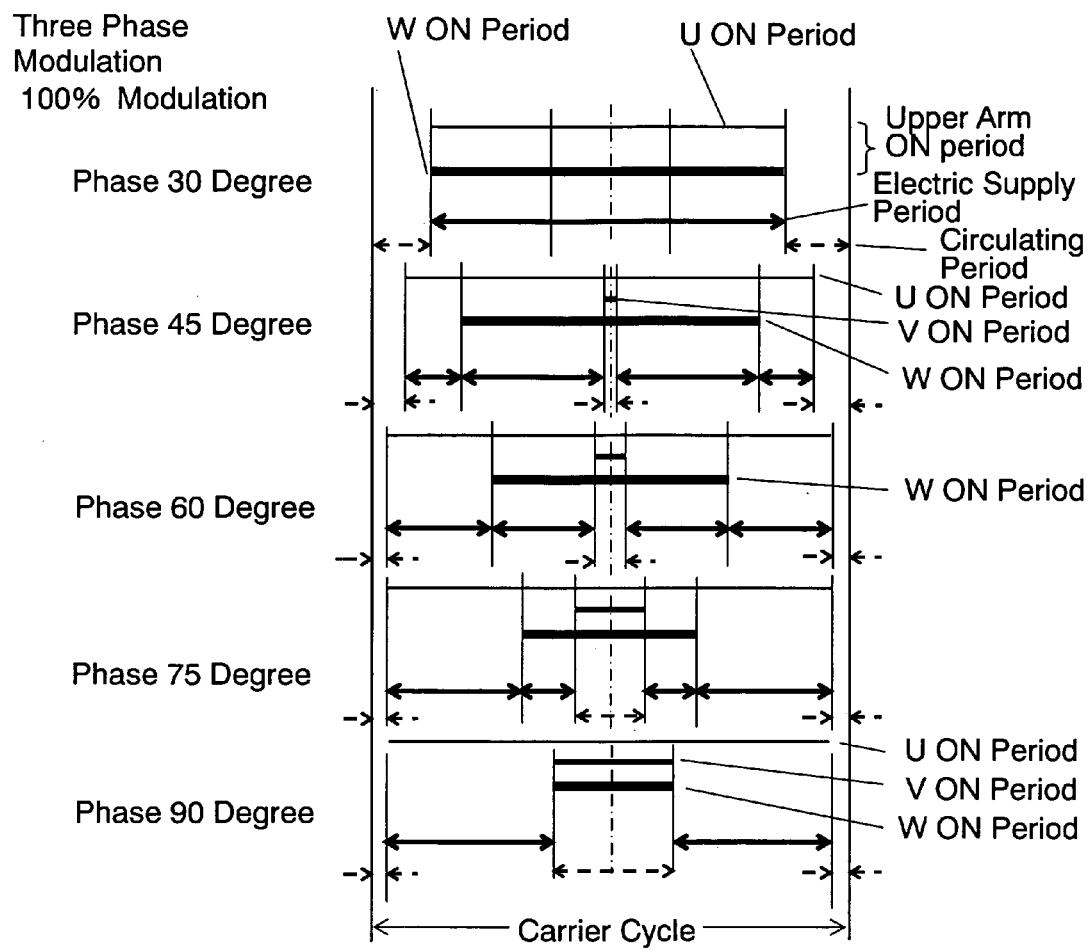
FIG. 4 is a characteristic chart showing an upper arm's ON period, an electric supply period and a circulating period at phases 30 degrees-90 degrees, in the first embodiment.
Figure 21:
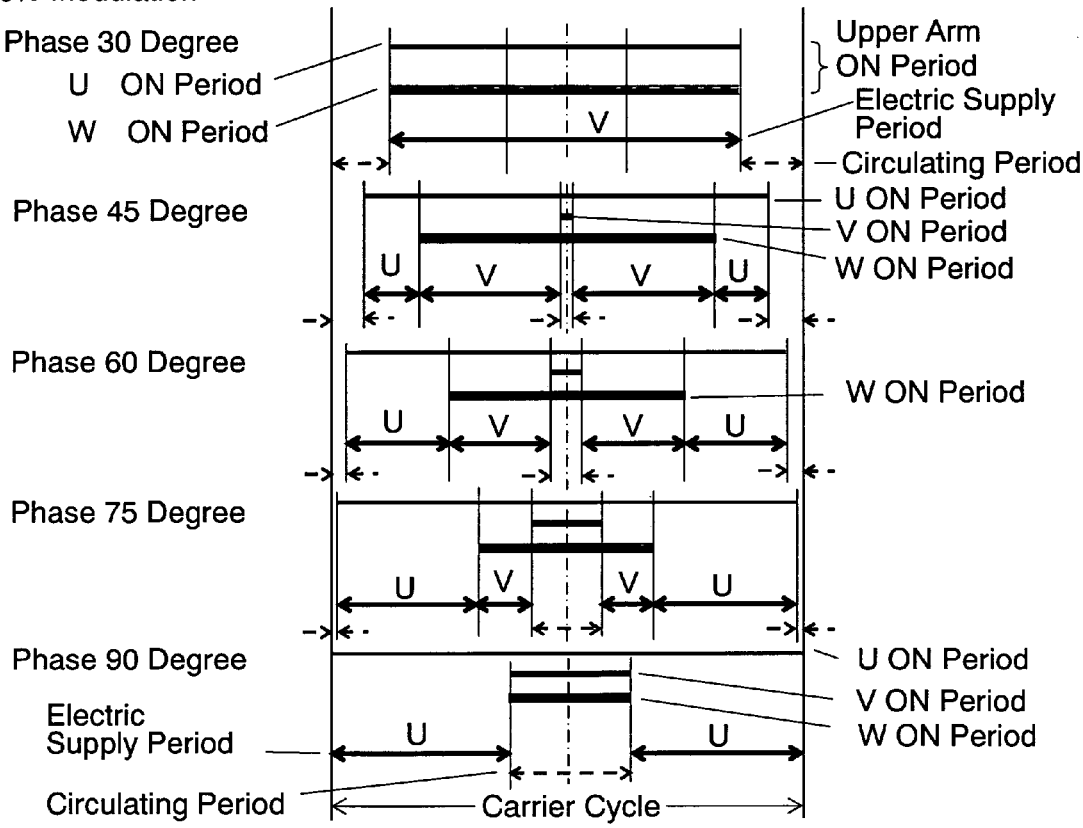
FIG. 21 is a characteristic chart showing an upper arm's ON period, an electric supply period and a circulating period at phases 30 degrees-90 degrees in 100% three phase modulation.

FIG. 4 shows the states which correspond to those of FIG. 21, where those at phase 90 degrees and phase 75 degrees have been replaced with those of FIG. 2 and FIG. 3.

Figure 5:
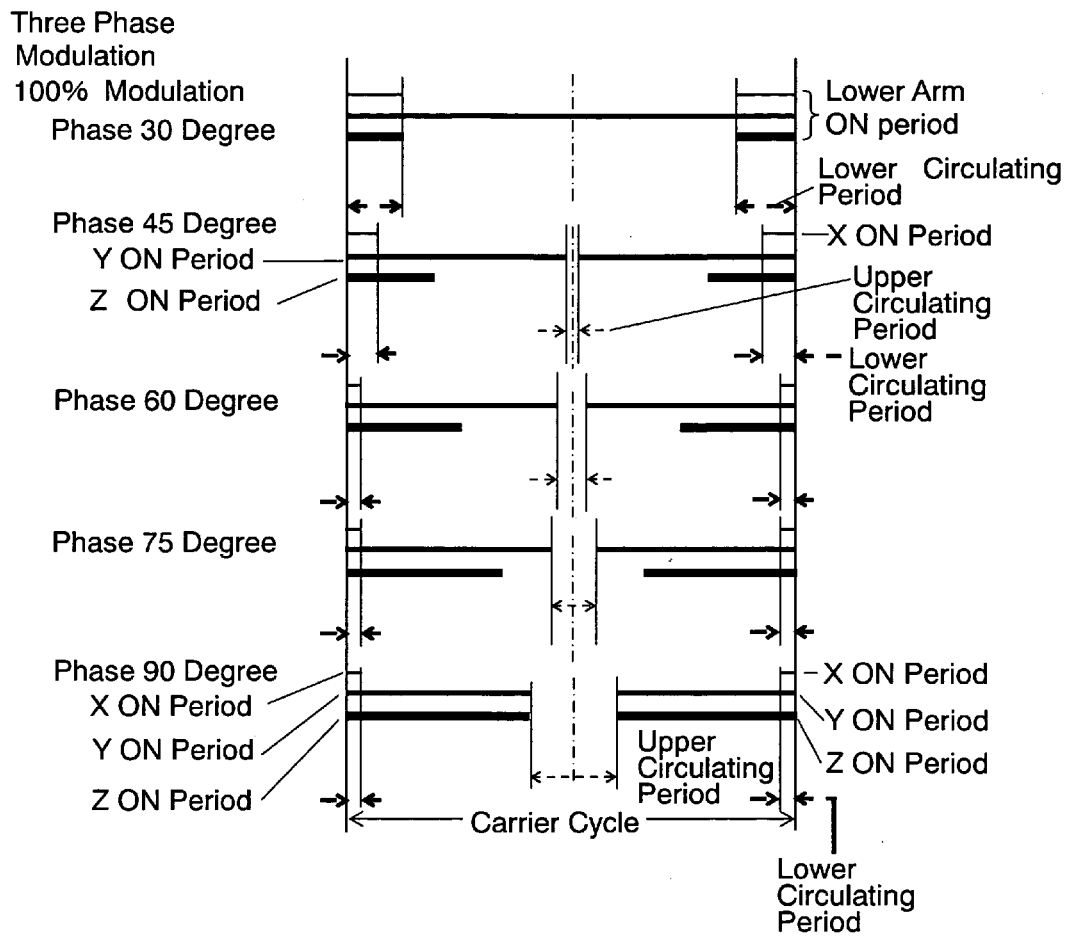
FIG. 5 is a characteristic chart showing a lower arm's ON period, an upper circulating period and a lower circulating period at phases 30 degrees-90 degrees, in the first embodiment.

FIG. 5 shows, based on FIG. 4, the lower arm's ON period, the upper circulating period and the lower circulating period at phase 30 degrees-phase 90 degrees. Because the dead time is eliminated, the lower circulating period has been secured for α at phase 90 degrees, for β at phase 75 degrees. Accordingly, the current flows in the lower arm in all the three phases. Likewise, the current flows in the lower arm for U, V, W phases, also at phase 210 degrees and phase 330 degrees including the neighborhoods.

Consequently, there is no need of changing the phases for current detection from time to time depending on phase (phase 90 degrees, phase 210 degrees, phase 330 degrees, etc.), it can be fixed to two certain specific phases. In the first embodiment, for example, it has been fixed to the phase U and the phase V. Current in the remaining phase W can be calculated by applying Kirchhoff's current law to the neutral point of stator winding 4.

As described earlier, shunt resistor 17 can be eliminated by modifying the control software at conventional control circuit 13 of inverter 22 (shown in FIG. 22) into control circuit 14.

Based on these detected current values, voltage induced at stator winding 4 by magnet rotor 5 of motor 11 is calculated for the position detection.

Thus, control software which deducts an identical ON period makes it possible to cut the number of shunt resistors to two pieces without causing any change in the PWM three phase modulation, without causing any current distortion, and without requiring to change the specific phases for current detection from time to time depending on phase. Furthermore, the carrier cycle shortening effect is made available even in a region where it used to be unavailable, and the current is made still smoother.

In driving of motor 11, since no current distortion is caused during the current detection (position detection), the motor can be driven at a low noise/vibration level.

Time (length) α, β may be determined to be longer than a minimum time needed for detecting the current in ON period of the lower arm (longer than a minimum current detection time). The minimum current detection time depends on the capability of control circuit used; a rough indication is approximately 3 μs. Without considering the dead time, the time α, β (length) is approximately 3 μs. Applying it to the earlier-described exemplary carrier cycle 200 μs; since there is α or β at the beginning and the end, it totals to 6 μs, or approximately 3% of a carrier cycle.

Considering the dead time, the time α, β (length) is a value which corresponds to a sum of the minimum current detection time and the dead time.

The deduction of identical ON period may be conducted only in a case where there is a phase in which ON period of the lower arm switching element is 0% or close to 0% in a carrier cycle (a case in which the time of lower circulating period is too short to secure a minimum time for current detection), such as 100% three phase modulation at phase 90 degrees. Therefore, it may not be necessary to conduct the deduction of identical ON period in most of the situations. Thus, it would not complicate the control circuit.

The deduction of ON period of the upper arm switching element for all the three phases is conducted avoiding a region in which a state where all the upper arm switching elements are ON (upper circulating period) is 0% or the neighborhood, viz. so as not to be close to 0%. By so doing, the carrier cycle shortening effect can be assured and the current smoothing effect of three phase modulation can be maintained. In the first exemplary embodiment, all the upper arm switching elements have a certain length of ON period (upper circulating period) both at phase 90 degrees and phase 75 degrees, as shown in FIG. 5.

Description has been made specifying the phases 30 degrees-90 degrees in FIG. 4 and FIG. 5. This is because it repeats the same pattern even in other phases.

Number of the shunt resistors needed is two pieces. Any one of the following combinations would do; shunt resistor 15 (phase U) and shunt resistor 16 (phase V), shunt resistor 16 (phase V) and shunt resistor 17 (phase W), and shunt resistor 17 (phase W) and shunt resistor 15 (phase U).

Figure 11:
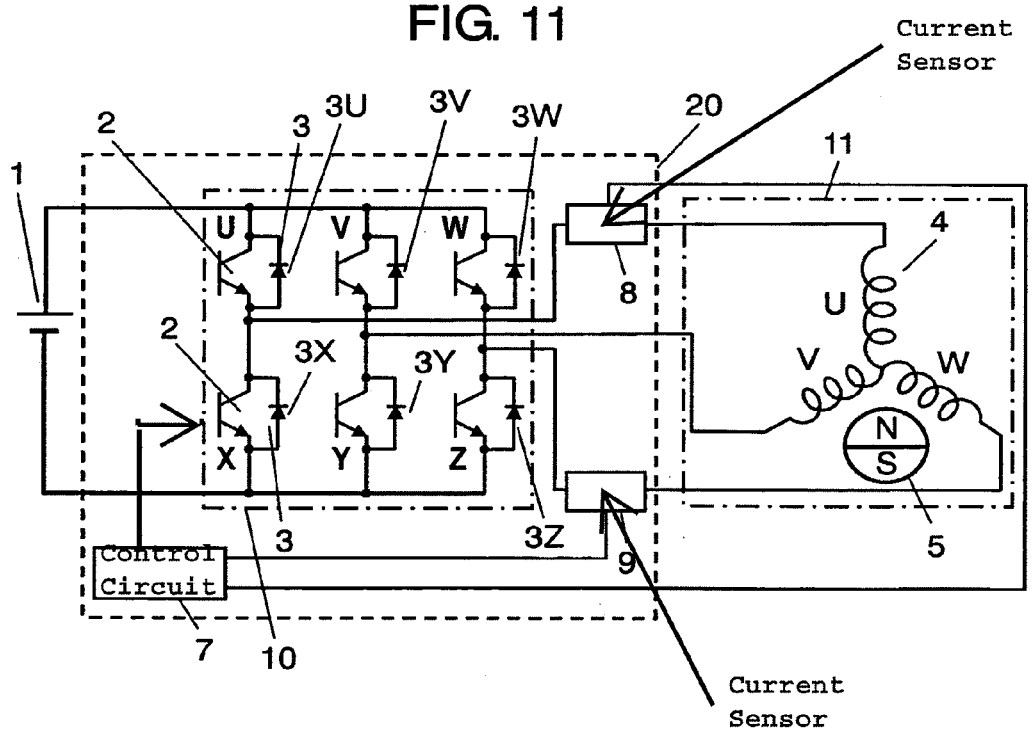
FIG. 11 is an electrical circuit diagram of an inverter and its periphery for detecting a phase current directly.
Figure 12:
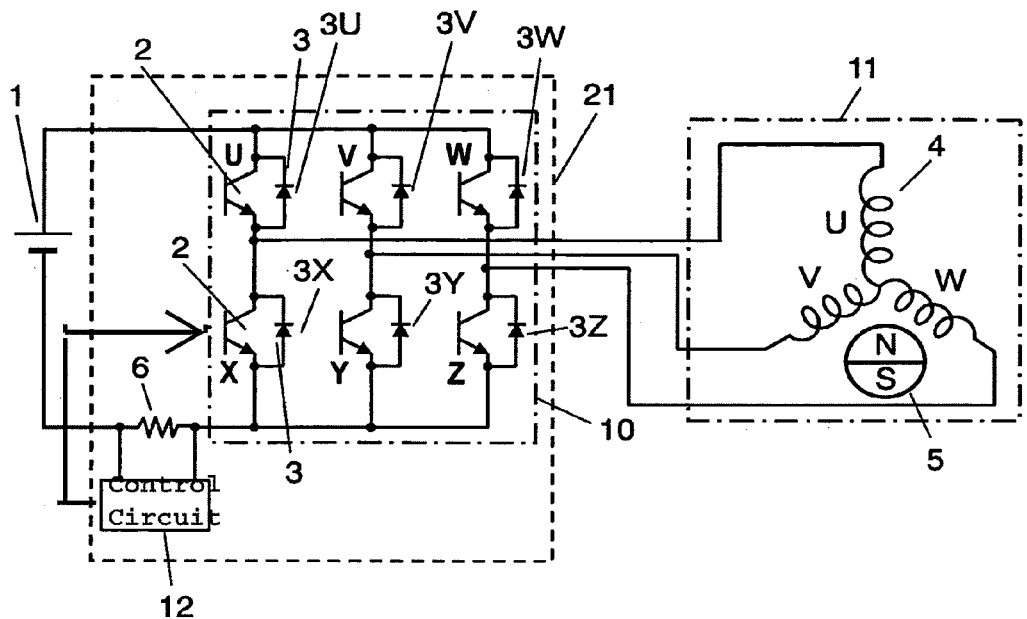
FIG. 12 is an electrical circuit diagram of an inverter and its periphery for detecting a phase current by means of shunt resistor in a power source line.
Figure 13:
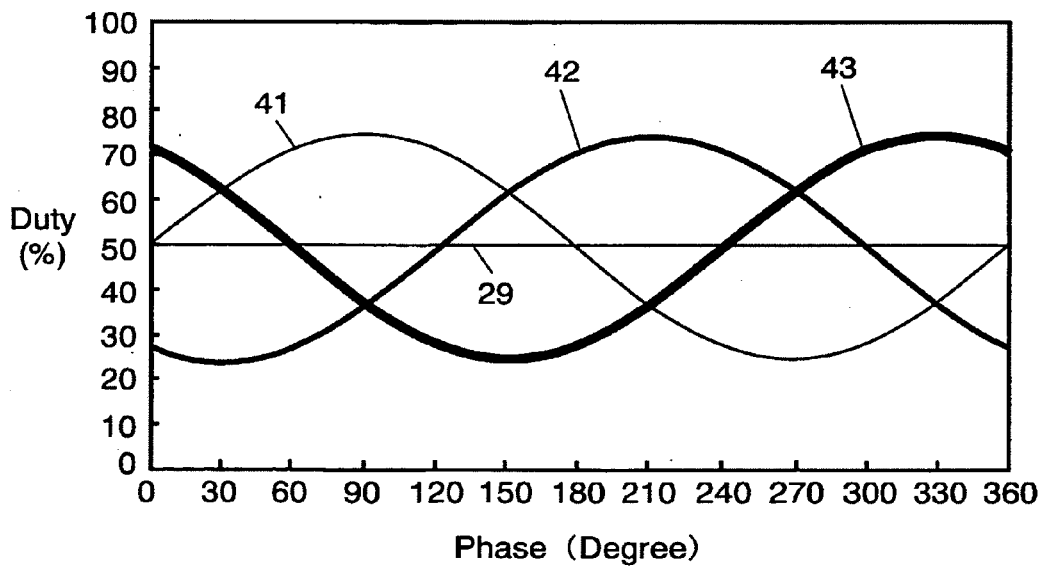
FIG. 13 is a characteristic chart showing modulation waveforms of respective phases at 50% three phase modulation.
Figure 14:
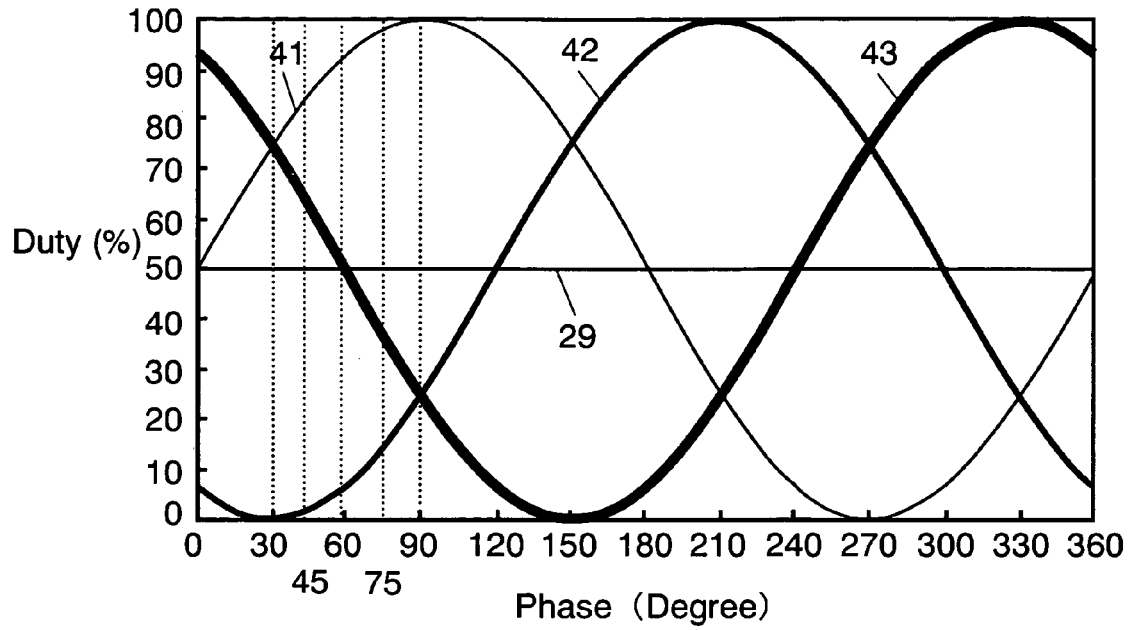
FIG. 14 is a characteristic chart showing modulation waveforms of respective phases at 100% three phase modulation.
Figure 15:
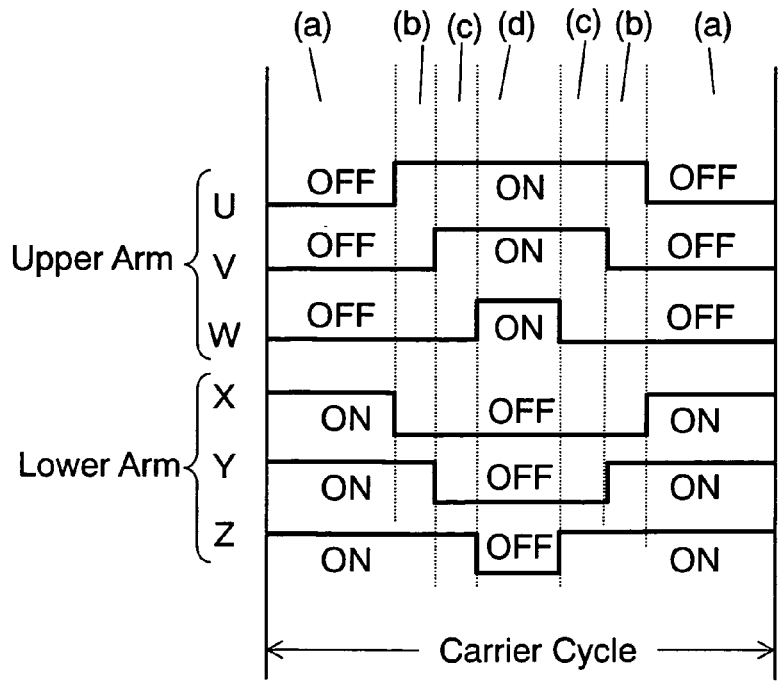
FIG. 15 is a timing chart of three phase modulation.
Figure 16:
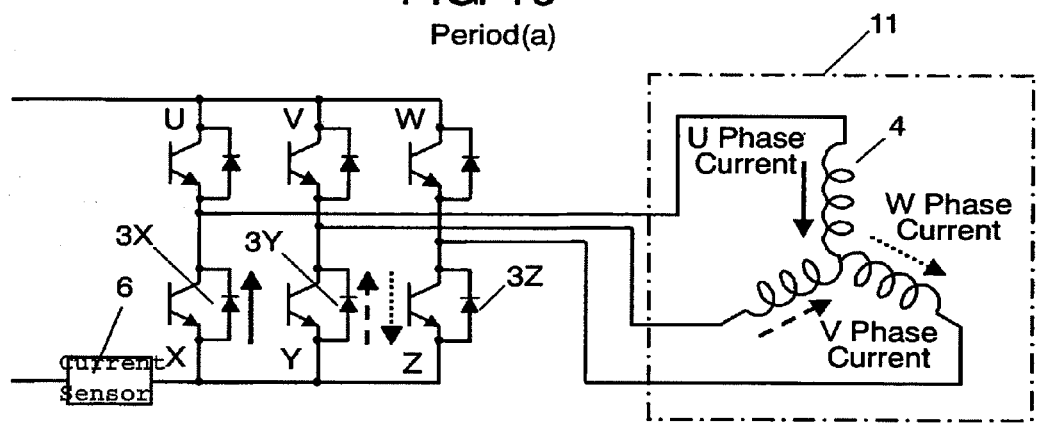
FIG. 16 is an electrical circuit diagram showing a current flow at period (a) of FIG. 15.
Figure 17:
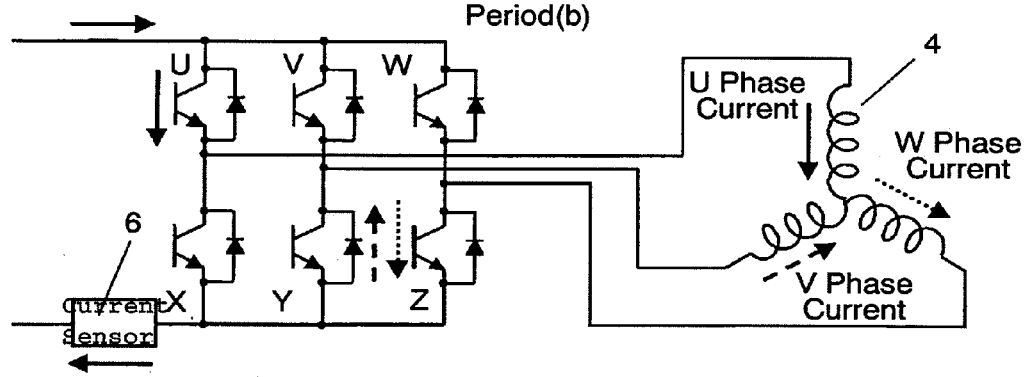
FIG. 17 is an electrical circuit diagram showing a current flow at period (b) of FIG. 15.
Figure 18:
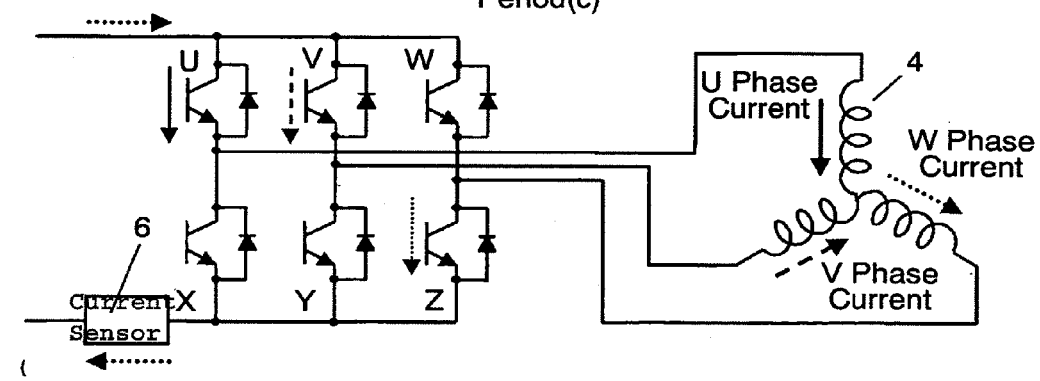
FIG. 18 is an electrical circuit diagram showing a current flow at period (c) of FIG. 15.
Figure 19:
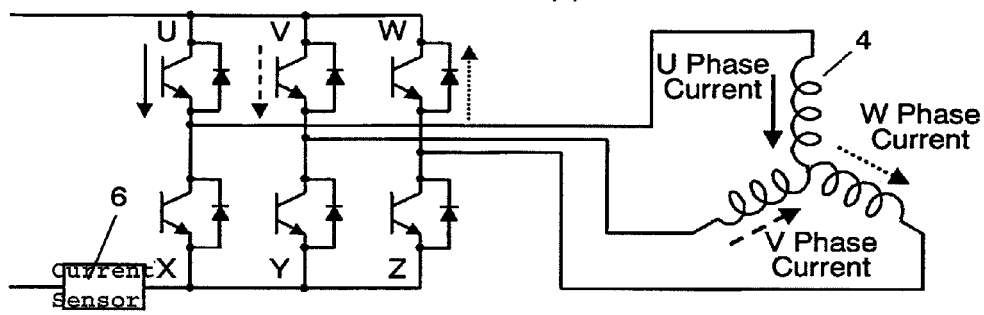
FIG. 19 is an electrical circuit diagram showing a current flow at period (d) of FIG. 15.
Figure 20:
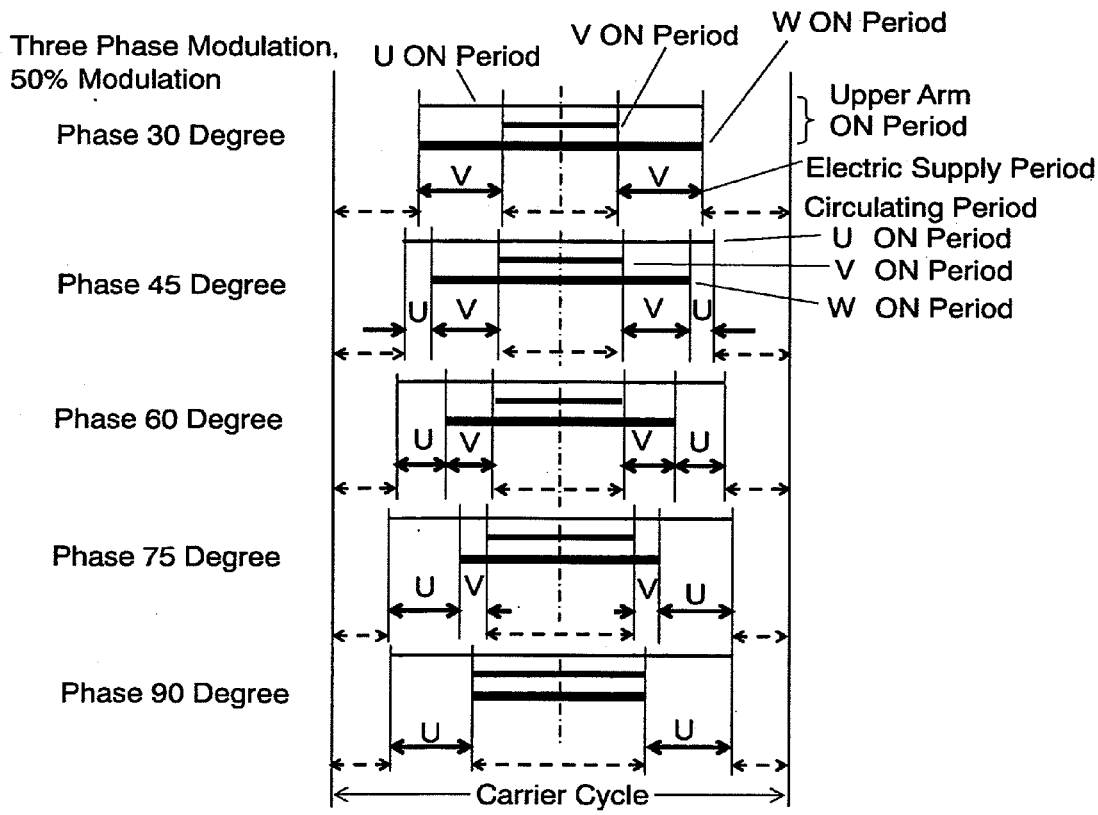
FIG. 20 is a characteristics chart showing an upper arm's ON period, an electric supply period and a circulating period at phases 30 degrees-90 degrees in 50% three phase modulation.

If, for example, the combination of shunt resistor 17 (phase W) and shunt resistor 15 (phase U) is used, it can detect the current values in phase W and phase U. Therefore it is easy to convert a conventional inverter 20 shown in FIG. 11, which detects the current values of phase W and phase U direct in the output line, into that of the new method. Practically, current sensor 8 and current sensor 9 are removed, and shunt resistors 17 and 15 are added. As to conversion of control circuit 7 into control circuit 14, it may be finished only by modifying the above-described control software of deducting identical ON period.

In the first embodiment, it is also possible to provide the circuit of FIG. 1 with additional shunt resistor 17 (phase W) and apply relevant adjustments. By so doing, the lower arm will have the current in all the three phases, and the current detection can be made for all the three phases within one carrier. Calculating a current in the remaining phase based on the current values of two phases turns out to be unnecessary, which would lead to simplified control software. Shunt resistor 15 (phase U) and shunt resistor 16 (phase V) are the indispensable items in FIG. 1. However, shunt resistor 17 (phase W) may be formed.

Shunt resistors 15 and 16 are one of the current detectors. The current detector is not limited to shunt resistors. Hall devices, diode (forward voltage is used) and other such devices may be used instead for the current detector.

Second Exemplary Embodiment

Characteristic charts of an inverter in accordance with a second embodiment of the present invention are shown in FIG. 6 through FIG. 9. Electrical circuit of the inverter and periphery remains the same as that of the first embodiment, which is shown in FIG. 1.

Figure 6:
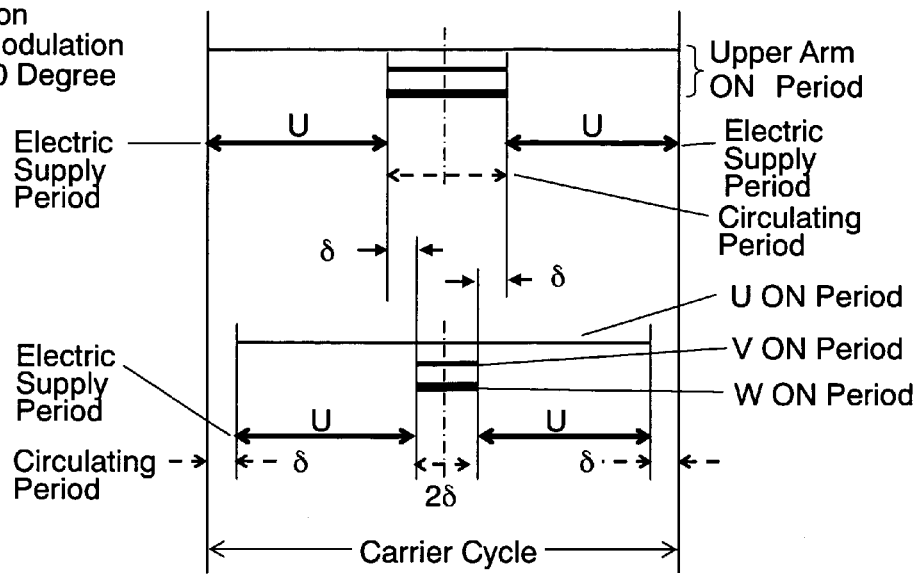
FIG. 6 is a characteristic chart showing an upper arm's ON period, an electric supply period and a circulating period at phase 90 degrees in accordance with a second embodiment of the present invention.

The upper part of FIG. 6 shows the situation of FIG. 21 at phase 90 degrees as it is. It is shown in the lower part that identical ON period 28 is deducted from ON periods of the respective upper arms U, V, W, and the length of upper circulating period (2δ) has been made to be equal to that of the lower circulating period (2δ=δ+δ).

Figure 7:
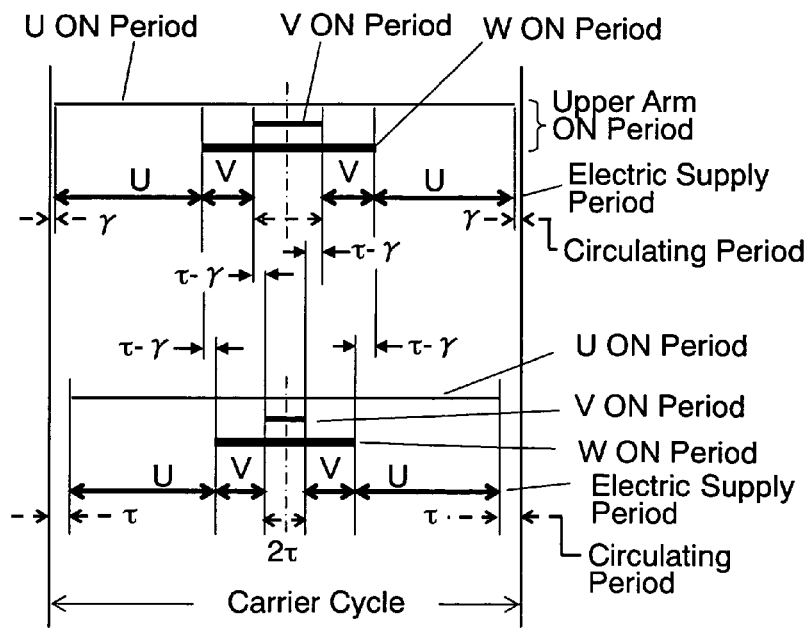
FIG. 7 is a characteristic chart showing an upper arm's ON period, an electric supply period and a circulating period at phase 75 degrees in the second embodiment.

Likewise, FIG. 7 shows the situation at phase 75 degrees. It is shown that identical ON period 2*(τ-γ) is deducted from ON periods of the respective upper arms U, V, W, and the length of upper circulating period (2τ) has been made to be equal to that of lower circulating period (2τ=τ+τ).

Accordingly, since the intervals among the electric supply periods become equal in the carriers ahead and behind, the carrier shortening effect is improved and current of the three phase modulation is made to be still smoother.

Figure 8:
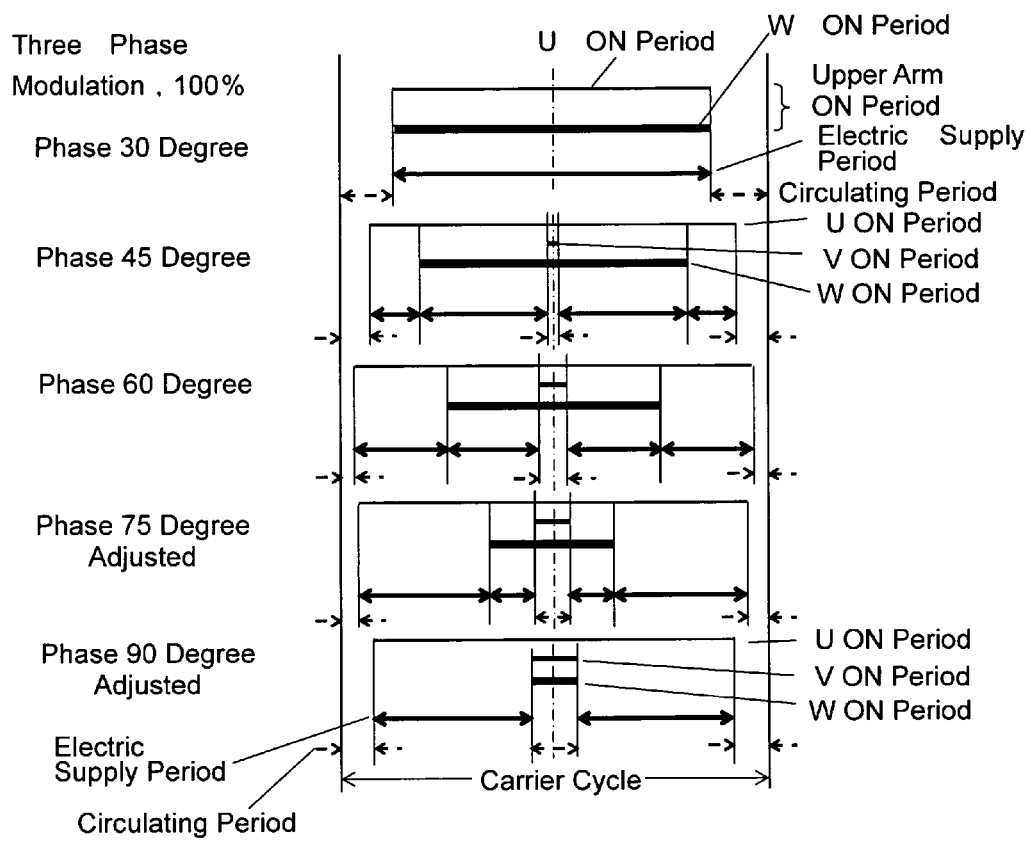
FIG. 8 is a characteristic chart showing an upper arm's ON period, an electric supply period and a circulating period at phases 30 degrees-90 degrees, in the second embodiment.

FIG. 8 corresponds to FIG. 21, with the situations at phase 90 degrees and phase 75 degrees replaced with those of FIG. 6 and FIG. 7.

Figure 9:
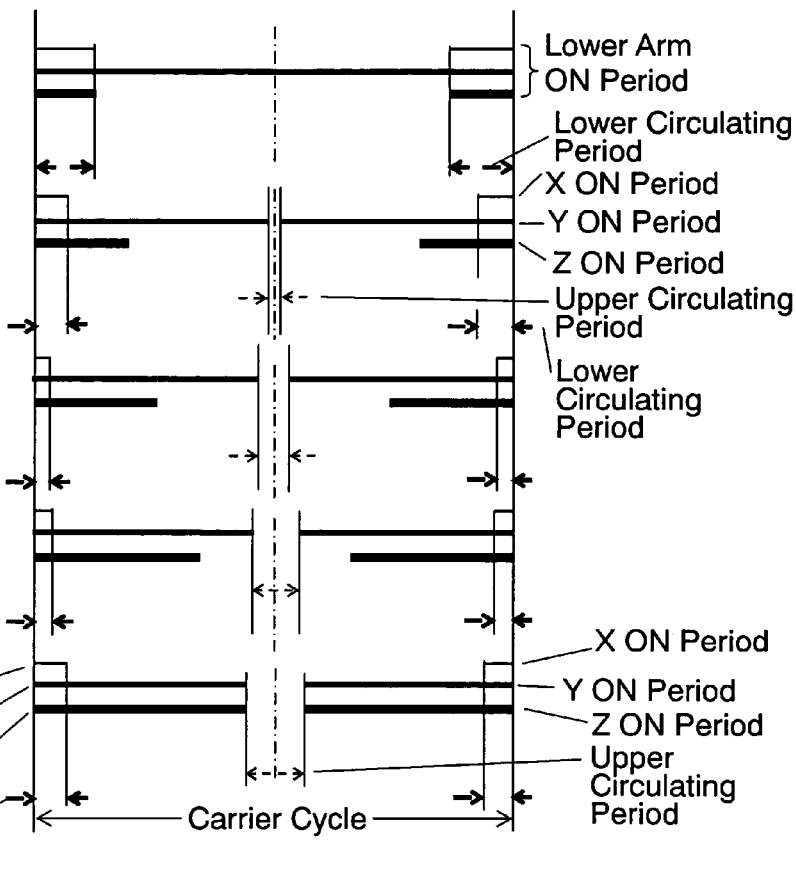
FIG. 9 is a characteristics chart showing a lower arm's ON period, an upper circulating period and a lower circulating period at phases 30 degrees-90 degrees, in the second embodiment.

FIG. 9 shows, on the basis of FIG. 8, the lower arm's ON period, the upper circulating period and the lower circulating period at phases 30 degrees-90 degrees. Because the dead time is eliminated, the lower circulating period has been secured for δ at phase 90 degrees, format phase 75 degrees.

Third Exemplary Embodiment

Figure 10:
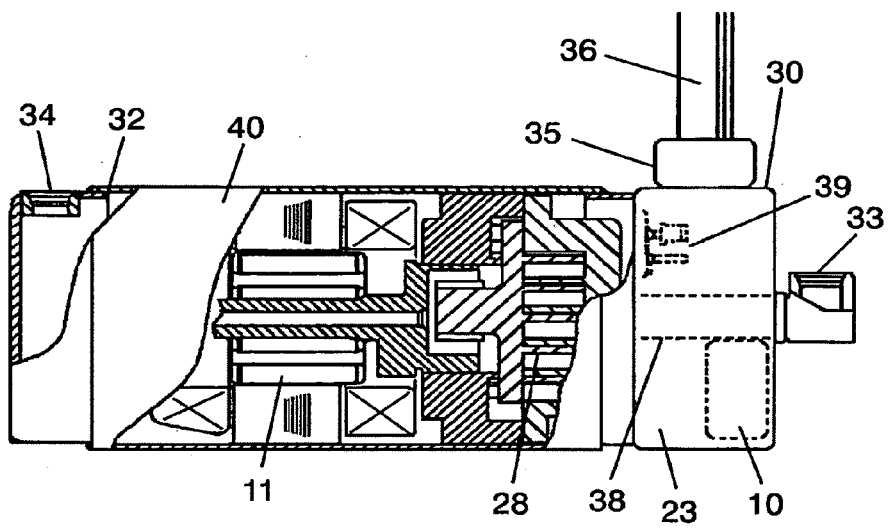
FIG. 10 is a cross sectional view of an electric compressor integrated with an inverter in accordance with a third embodiment of the present invention.

FIG. 10 shows electric compressor 40 and inverter 23. The inverter 23 is mounted closely to the right side of the compressor 40. Compression mechanism 28, motor 11, or the like are placed in metal container 32.

Refrigerant is sucked-in from intake 33, and compressed by compression mechanism 28 (a scroll unit, in this example) which is driven by motor 11. When the compressed refrigerant passes through motor 11, the refrigerant cools motor 11, and then is discharged from outlet 34.

To facilitate the mounting to electric compressor 40, inverter 23 is housed in casing 30. The inverter's circuit portion 10, which is the source of heat generation, is cooled by low pressure refrigerant via low pressure piping 38. In order to avoid dewing, inverter 23 is disposed below intake pipe 38 so that ambient temperature of inverter circuit 10 is also lowered for making a temperature difference smaller.

Terminal 39, which is coupled with the winding of motor within inside of electric compressor 40, is connected with the output of inverter circuit 10. Connecting wire 36 held by holder 35 of inverter 23 includes the power supply line of battery 1 and the signal wire for transmitting rotating speed from the air-conditioner's controller (not shown).

The essential conditions requested by the inverter-integrated electric compressors are that inverter 23 is small in size and can withstand vibration, and that it can drive electric compressor's motor at a low vibration level. Therefore, the present embodiment may be one of the most suitable fields of application.

Although the above embodiments have been described based on the supply of direct current from a battery, the power supply source is not limited as such. A rectified commercial AC power may be used instead of the direct current source. Likewise, the motor is not limited to the sensorless DC brushless motor, it can be applied to an induction motor, etc. The advantage of low-noise would be significant when it is used in a low-noise vehicle such as an electric vehicle, a hybrid vehicle, a fuel-cell vehicle.

Although the cases of three phase have been exemplified, it may be applied likewise also to the multi-phase cases of more than three phases.

The above descriptions have exemplified the cases where the shunt resistor is disposed between the lower arm switching element and the minus side of direct current source for two phases of the three phases. Since the current between the lower arm switching element and the motor is equal to that between the lower arm switching element and the minus side of the direct current, the resistor may be disposed above the lower arm switching element for detecting a current to the motor.

Although the cases where the current is detected in the lower circulating have been exemplified, it may be applied also to the cases where the current detection is conducted in the upper circulating at the neighborhood of the middle of a carrier cycle. In this case, the shunt resistor for detecting the current between the upper arm and the plus side of the power source is provided for two phases, and identical ON period is added to all the three phases of 100% three phase modulation at phase 30 degrees, phase 45 degrees, etc. This case also provides the same advantages.

Figure 25:
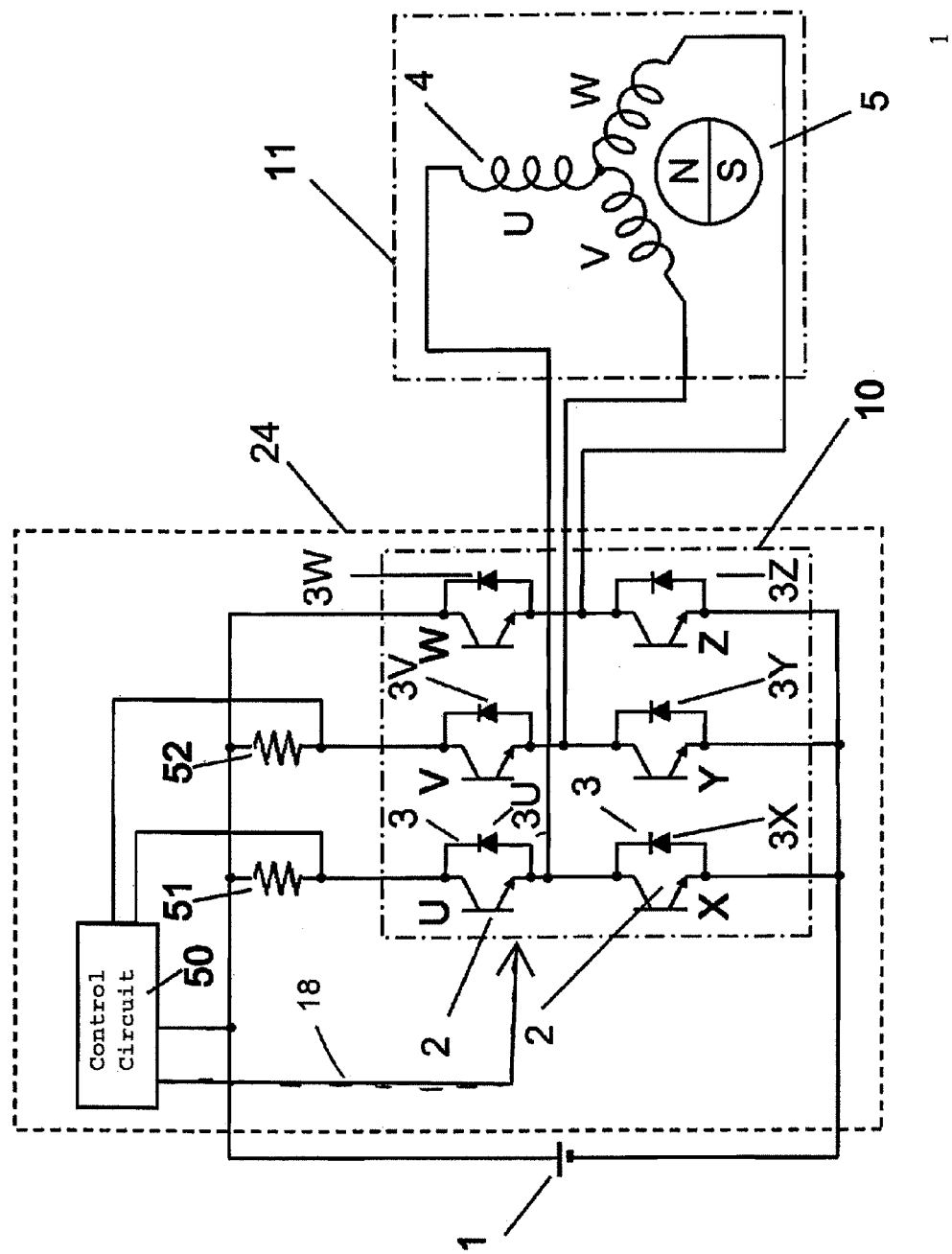
FIG. 25 is an electrical circuit diagram of an inverter and its periphery in accordance with an alternate embodiment of the present invention.

FIG. 25 shows an electrical circuit diagram of inverter 24 and its periphery in accordance with an alternate embodiment of the present invention. As compared with the first exemplary embodiment shown in FIG. 1, the control circuit 50 has replaced control circuit 14 and shunt resisters 51 and 52 have replaced shunt resisters 15 and 17. The control circuit 50 calculates currents based on voltages respectively generated at shunt resisters 51 and 52 provided between the upper arm switching element U and the plus side of the power source 1 and upper arm switching element V and the plus side of the power source 1. Other portions of the circuit remain the same as shown in FIG. 1, and the same symbols are used for the respective corresponding items.

As in the first exemplary embodiment, the number of shunt resistors needed is two and any combination of two shunt resisters provided between the upper arm switching elements is acceptable.

INDUSTRIAL APPLICABILITY

An inverter in the present invention which is compact in size and high in the vibration-withstanding capacity is capable of detecting the phase current without requiring the development of control software of high complexity, and without causing any current distortion. Therefore, the inverter can be used widely in various types of consumer appliances as well as industrial appliances. It is applicable also to other loads of the alternating current devices, besides the motors.

The invention claimed is:

1. An inverter for use with a direct current power source, said inverter comprising:

an upper arm switching element connected with a plus side of the direct-current power source;

a lower arm switching element connected with a minus side of the direct-current power source for outputting sine wave-like three phase alternating current by switching a direct-current voltage of the direct-current power source by means of PWM three phase modulation;

a current detector for detecting a current which flows between the lower arm switching element and the minus side of the direct-current power source, said current detector being provided in only two phases among the three phases; and a control circuit for detecting a phase current of the two phases provided by the current detector by deducting identical ON periods in all the three phases from ON periods of the upper arm switching element within a carrier cycle.

2. The inverter of claim 1, wherein
the control circuit deducts the ON period in all the three phases when there exists a phase in which an ON period of the lower arm switching element is 0% or close to 0% within a carrier cycle.

3. The inverter of claim 1, wherein
the control circuit deducts the ON period in all the three phases avoiding a term in which ON periods of all the upper arm switching element are 0% or close to 0%.

4. The inverter of claim 1, wherein
the control circuit deducts the ON period in all the three phases so that a time length of a term in which all the upper arm switching elements are ON approximately equals to that of a term in which all the upper arm switching elements are OFF.

5. The inverter of claim 1, wherein the current detector is a shunt resistor.

6. The inverter of claim 1, wherein
the sine wave-like three phase alternating current is outputted to a sensorless DC brushless motor, and a position of a rotor of the sensorless DC brushless motor is judged based on the detected two phase currents.

7. The inverter of claim 6, wherein the inverter is mounted on an electric compressor which is driven by the sensorless DC brushless motor.

8. The inverter of claim 1, wherein the inverter is used on board a vehicle.

9. An inverter for use with a direct current power source, said inverter comprising:
an upper arm switching element connected with a plus side of the direct-current power source; and
a lower arm switching element connected with a minus side of the direct-current power source for outputting sine wave-like three phase alternating current by switching a direct-current voltage of the direct-current power source by means of PWM three phase modulation;
a current detector for detecting a current which flows between the upper arm switching element and the plus side of the direct-current power source, the current detector being provided in only two phases among the three phases; and
a control circuit for detecting a phase current of the two phases provided by the current detector by adding identical ON periods in all the three phases to ON periods of the upper arm switching element within a carrier cycle.

10. The inverter of claim 9, wherein
the control circuit adds the ON period in all the three phases when there is a phase in which the ON period of the upper arm switching element is 0% or close to 0% within a carrier cycle.

11. The inverter of claim 9, wherein
the control circuit adds the ON period in all the three phases avoiding a term in which ON periods of all the lower arm switching element are 0% or close to 0%.

12. The inverter of claim 9, wherein
the control circuit adds the ON period in all the three phases so that a time length of a term in which all the upper arm switching elements are ON approximately equals to that of a term in which all the upper arm switching elements are OFF.

13. The inverter of claim 9, wherein the current detector is a shunt resistor.

14. The inverter of claim 9, wherein
the sine wave-like three phase alternating current is outputted to a sensorless DC brushless motor, and a position of a rotor of the sensorless DC brushless motor is judged based on the detected two phase currents.

15. The inverter of claim 9, wherein the inverter is used on board a vehicle.

* * * * *